(12) United States Patent
Knowles

(10) Patent No.: US 7,727,299 B2
(45) Date of Patent: Jun. 1, 2010

(54) EXTENDED SURFACE PLEAT AIR FILTER

(75) Inventor: Art Knowles, Andalusia, AL (US)

(73) Assignee: Filtration Manufacturing, Inc., Andalusia, AL (US)

( * ) Notice: Subject to any disclaimer, the term of this patent is extended or adjusted under 35 U.S.C. 154(b) by 0 days.

(21) Appl. No.: 11/509,273

(22) Filed: Aug. 24, 2006

(65) Prior Publication Data

US 2006/0277879 A1 Dec. 14, 2006

(51) Int. Cl.
*B01D 46/00* (2006.01)
(52) U.S. Cl. ............................... 55/497; 55/501; 55/502; 55/DIG. 31; 55/DIG. 35
(58) Field of Classification Search ............... 55/497, 55/511, 521, DIG. 31, 502, 495, 500, 492, 55/496, 501, DIG. 35, 498; 210/493.3, 495
See application file for complete search history.

(56) References Cited

U.S. PATENT DOCUMENTS

| | | | |
|---|---|---|---|
| 3,076,303 A | 2/1963 | Durgeloh | |
| 3,183,286 A | 5/1965 | Harms | |
| 3,659,719 A | 5/1972 | Westlin et al. | |
| 3,873,288 A | 3/1975 | Wachter et al. | |
| 4,204,846 A | 5/1980 | Brenholt | |
| 4,452,619 A | 6/1984 | Wright et al. | |
| 4,824,450 A | 4/1989 | Howard | |
| 5,192,343 A | 3/1993 | Henry | |
| 5,306,321 A | 4/1994 | Osendorf | |
| 5,427,597 A | 6/1995 | Osendorf | |
| 5,531,892 A | 7/1996 | Duffy | |
| 5,618,324 A | 4/1997 | Sommer et al. | |
| 5,620,505 A | 4/1997 | Koch et al. | |
| 5,879,423 A | 3/1999 | Luka et al. | |
| 5,944,860 A * | 8/1999 | Mack et al. | 55/492 |
| 6,045,599 A | 4/2000 | Solberg, Jr. | |
| 6,123,617 A | 9/2000 | Johnson | |
| 6,126,708 A | 10/2000 | Mack et al. | |
| 6,319,300 B1 | 11/2001 | Chen | |
| 6,361,577 B1 | 3/2002 | Unrath et al. | |
| 6,602,128 B1 | 8/2003 | Spengler | |
| 6,793,703 B1 | 9/2004 | Sledge et al. | |
| 6,824,581 B1 | 11/2004 | Tate et al. | |
| 6,830,443 B1 | 12/2004 | Coffey et al. | |
| 6,833,017 B2 * | 12/2004 | Quigley | 55/497 |
| 6,875,250 B2 | 4/2005 | Terlson | |

(Continued)

*Primary Examiner*—Duane Smith
*Assistant Examiner*—Minh-Chau T Pham
(74) *Attorney, Agent, or Firm*—Thompson Hine LLP

(57) ABSTRACT

A high efficiency air filter for use in a standard return air grille is provided. Standard return air grilles possess filter receptacles for accepting air filters, a closeable cover with a cover flange for engaging air filters and a duct interface that leads away from the air grille to the remainder of the return air ducts. The air filter has a filter flange with a gasket that is sized to fit within the filter receptacle of the air grille, such that when the cover is closed, the cover flange seals against the cover and the filter receptacle. The gasket is affixed to a housing that is sized to extend beyond the filter receptacle into the duct extending beyond the return air grille. An extended pleat air filter is contained within and sealed to the walls of the housing such that air passing through the return air grille substantially passes through the air filter prior to entering the remainder of the return air duct.

20 Claims, 4 Drawing Sheets

U.S. PATENT DOCUMENTS

| | | |
|---|---|---|
| 6,932,850 B1 | 8/2005 | Welch et al. |
| 6,955,702 B2 | 10/2005 | Kubokawa et al. |
| 7,004,989 B2 | 2/2006 | Karlsson |
| 7,048,501 B2 | 5/2006 | Katayama et al. |
| 7,090,713 B2 | 8/2006 | Terlson |
| 7,258,717 B2 * | 8/2007 | Duffy ......................... 55/497 |
| 7,261,757 B2 * | 8/2007 | Duffy ......................... 55/502 |
| 2003/0177745 A1 | 9/2003 | Jauw |

* cited by examiner

FIG. 2
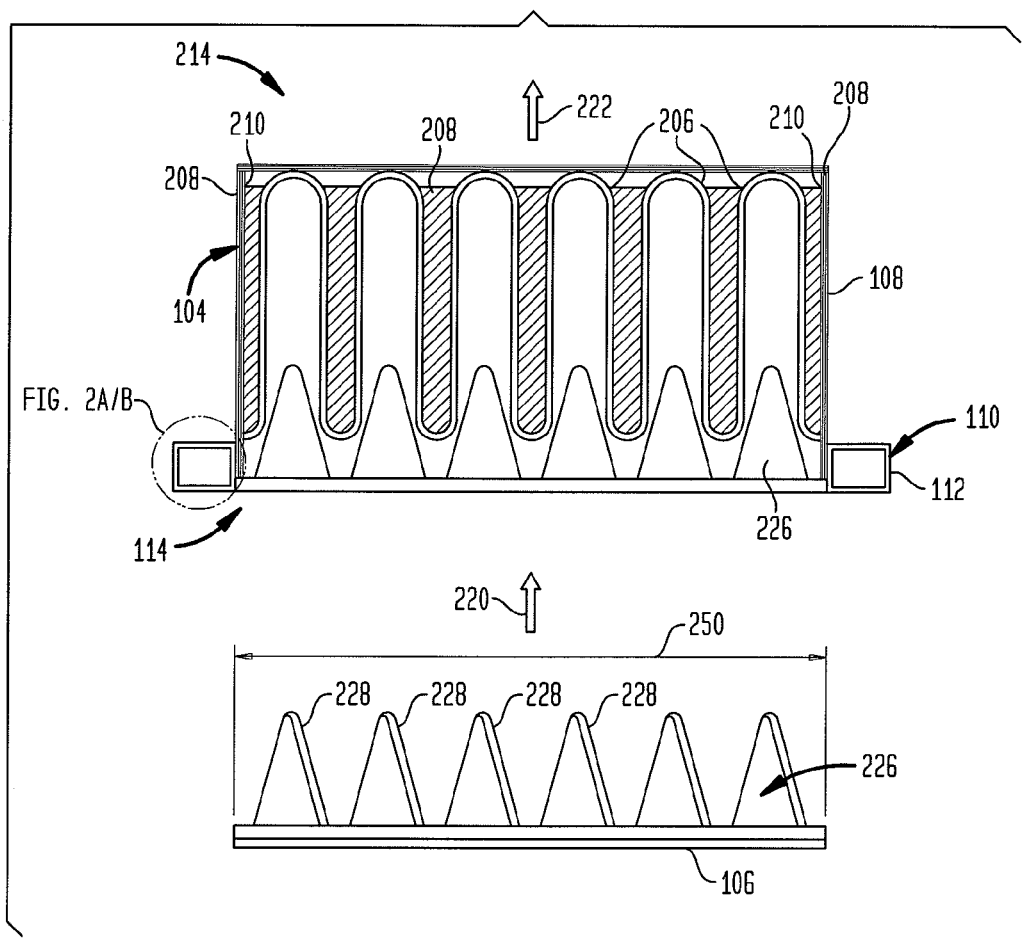
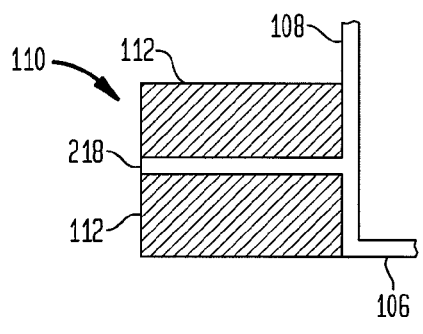
FIG. 2A
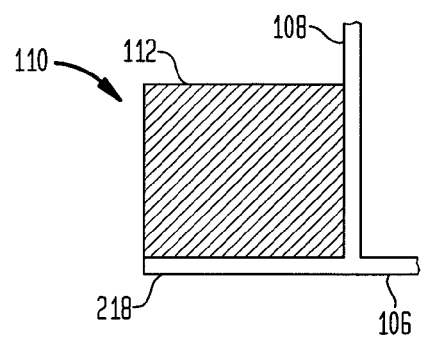
FIG. 2B

EXTENDED SURFACE PLEAT AIR FILTER

TECHNICAL FIELD

The present invention relates to air filters for home and light commercial ventilation systems, and more particularly to extended surface air filters that fit into a standard, unmodified return air grille.

BACKGROUND

Air filters provide two important functions in any ventilation system, the first function is to remove particulates from the air circulating through the system and the second function is to provide adequate airflow for the system to operate efficiently. The most common method employed to remove particulates from a ventilation system is an air filter. Air filters can be placed at various locations throughout a ventilation system, but a common place for installation is in the return air grille. A standard return air grille is normally one inch deep and thus only accommodates at most a one inch thick air filter. The amount of pressure drop or airflow restriction through an air filter is dictated by the level of filtration needed and the surface area of the air filter presented to the air flow. As the level of filtration or filtration efficiency increases, the airflow reduction or pressure drop resulting from the filter is increased. There are two approaches to overcoming the increased pressure drop from higher efficiency air filters. The first, installing a larger fan to overcome the increased pressure drop, results in increased energy consumption and reduced fan life. The second approach involves modifying the return air grille to accommodate an air filter with greater surface area, which is costly and difficult due to the modification of the ductwork and return air grille required.

Thus, there is a need for a high efficiency filter that has improved filtration efficiency without the need to use a larger fan or modify the return air grille or ductwork.

BRIEF DESCRIPTION OF THE DRAWINGS

The accompanying figures depict multiple embodiments of an air filter for residential and light commercial ventilation systems that enables an extended pleat air filter to be housed in a standard return air grille providing enhanced filtration with reduced pressure drop across the air filter. A brief description of each figure is provided below. Elements with the same reference numbers in each figure indicate identical or functionally similar elements. Additionally, the left-most digit(s) of a reference number identifies the drawings in which the reference number first appears.

FIG. 2 is a sectional view of one embodiment of an air filter looking from a side.

FIG. 2A is a close up view of one embodiment of a filter flange with a single gasket.

FIG. 2B is a close up view of another embodiment of a filter flange with a gasket sandwich.

DETAILED DESCRIPTION

Figure 1:
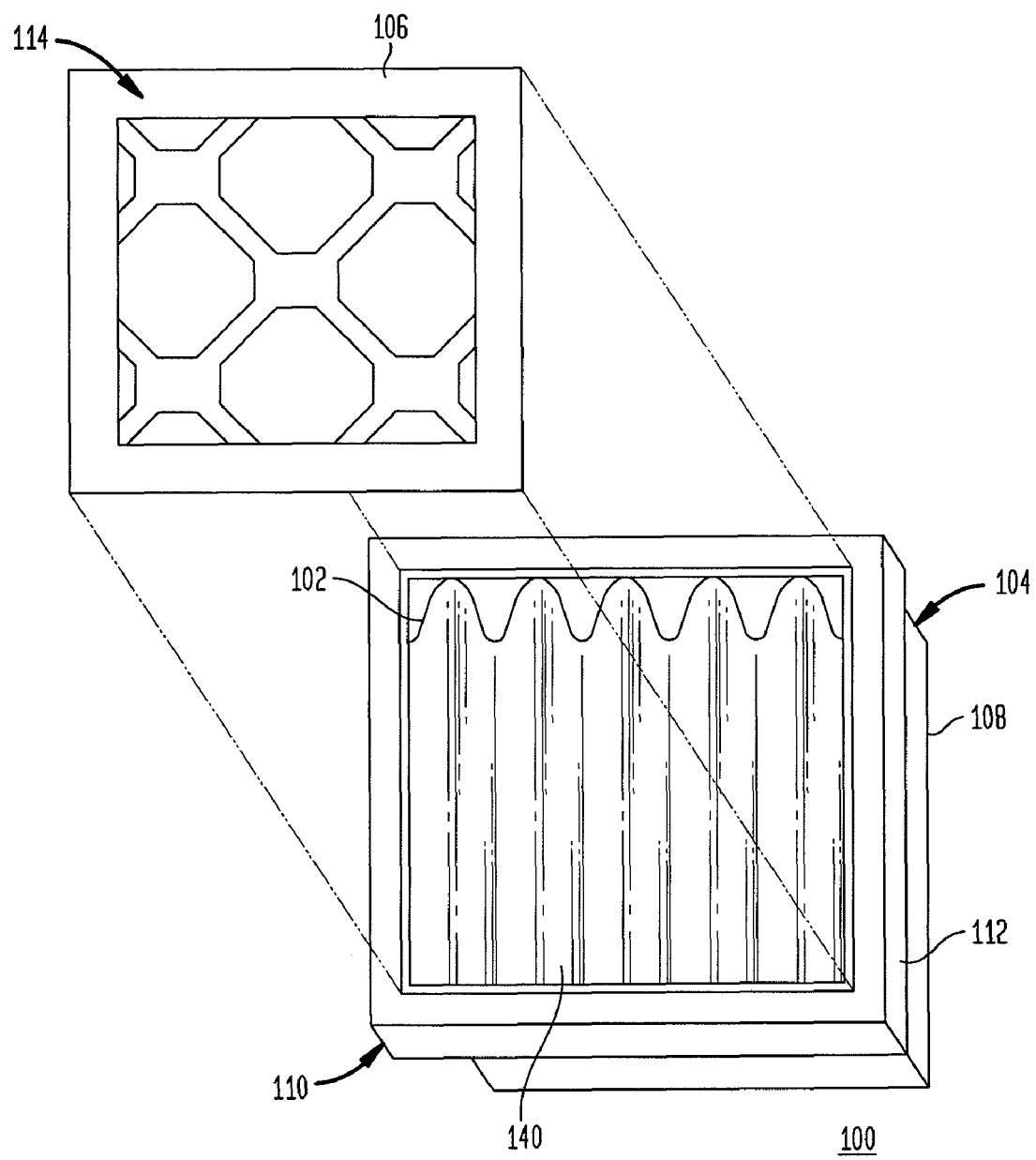
FIG. 1 is a perspective view of one embodiment of an air filter.

FIG. 1 depicts a first embodiment of the front face 114 of an air filter 100. The air filter 100 is comprised of a housing 104 where the housing 104 has walls 108, a front cover 106, and a back cover (not shown). Surrounding the periphery of the housing 104 is a filter flange 110. The filter flange 110 in the embodiment of an air filter 100 depicted in FIG. 1 is wholly comprised of a gasket 112. The gasket 112 in the embodiment depicted extends around the full periphery of the housing 104 and forms the full extent of the filter flange 110.

Figure 3:
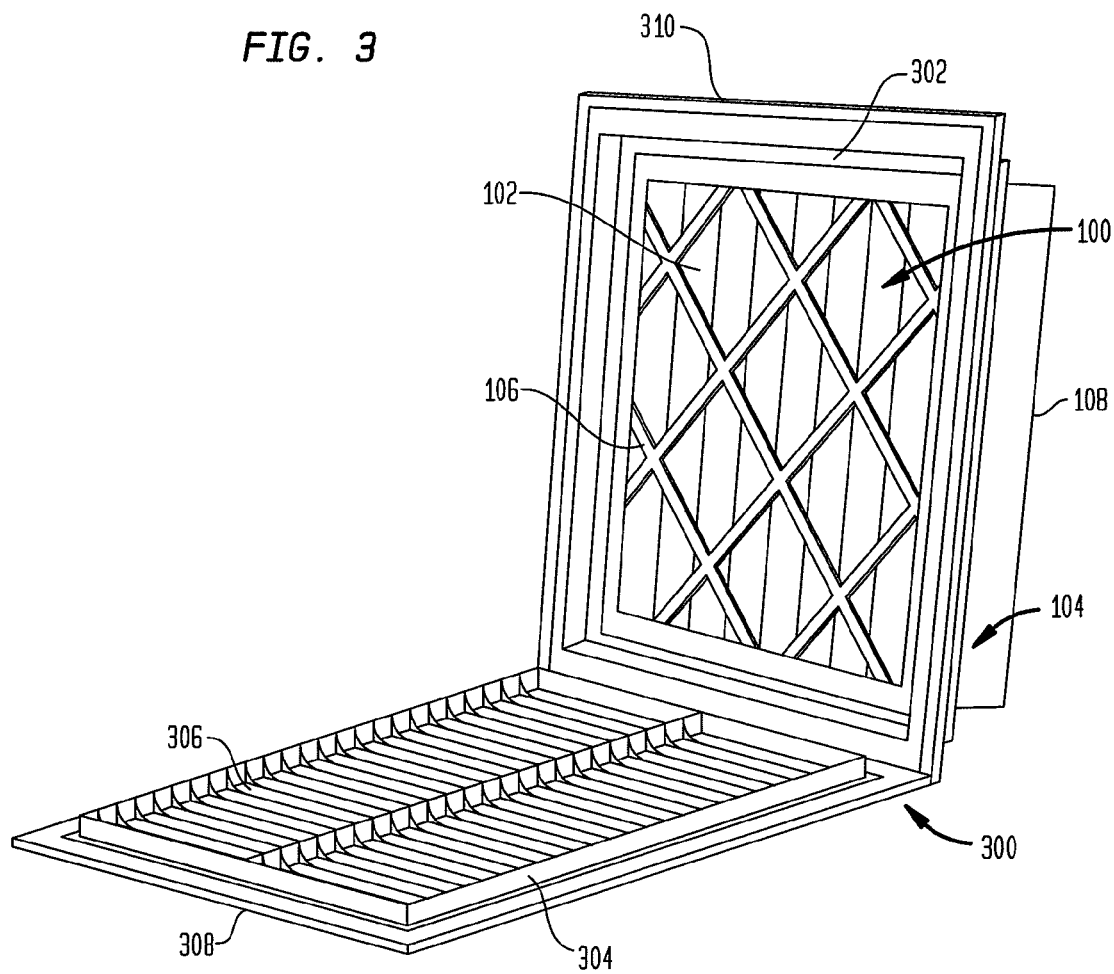
FIG. 3 is a perspective view of one embodiment of an air filter installed in a standard return air grille.
Figure 4:
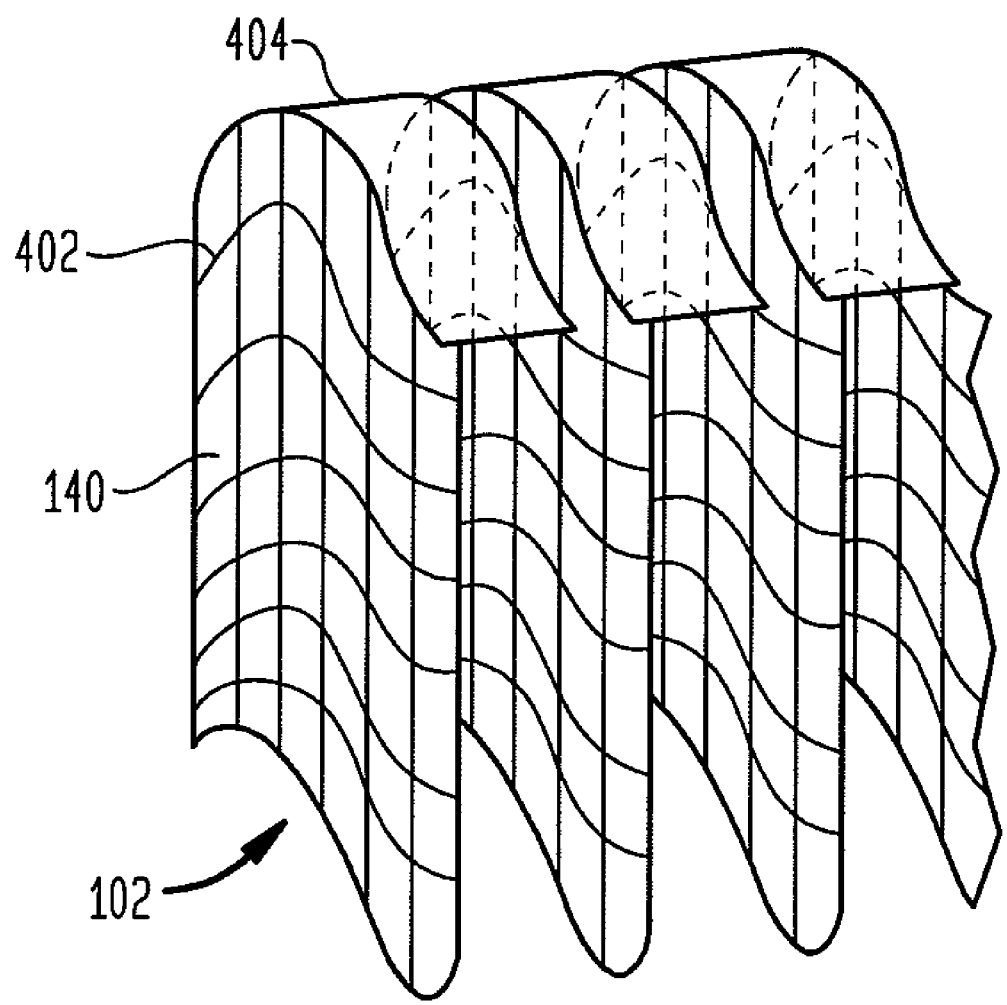
FIG. 4 is a perspective view of one embodiment of the extended pleat filter medium with excess filter medium folded to create a seal around the extended pleat filter medium.

The housing 104 in one embodiment of the air filter is comprised of polymer coated paperboard. In yet another embodiment, the housing 104 is comprised of laminated cardboard. In still other embodiments, the housing 104 is formed from materials selected from the following group consisting of paper, cardboard, plastic, and metal. The selection of housing 104 materials may be accomplished by one of ordinary skill in the art with the objective of providing a means to support the extended surface air filter 102 and be affixed to the filter flange 110. The housing 104 is sized and shaped to substantially slide within a standard air duct disposed behind a filter receptacle 302 of a return air grille 300 as shown in FIG. 3.

Contained within the housing 104 and the front cover 106 and back cover (not shown) of the air filter 100 is an extended pleat filter medium 102. Referring now to FIG. 2, the extended pleat filter medium 102 is disposed within an interior volume defined by the housing 104 and affixed to the interior surface of the walls 108 of the housing 104 to hold it in place. The front cover 106 and back cover are substantially open such that they assist in retaining the extended pleat filter medium 102 within the interior volume of the housing 104 while allowing incoming air 220 to pass through the air filter 100 by traveling through the front cover 106, through the extended pleat filter medium 102, and through the back cover to emerge as filtered air 222.

The housing 104 can be selected by one of ordinary skill in the art to house a variety of different sizes of extended pleat filter medium 102. The housing 104 in one embodiment is flush mounted with the filter flange 110 such that the top surface 106 is substantially level with the surface of the filter flange 110 facing the front face 114 of the air filter 100. The depth of the air filter 100 penetration beyond the return air grille 300 is limited primarily by the depth or size of the return air duct extending beyond the return air grille 300. For most household and light commercial installations, the return air grille 300 is installed into a metal boot or other adaptor to join the return air duct to the return air grille 300. In an alternative installations, the return air grille 300 is installed directly into the side or end of a metal duct. In either approach, the depth of the air filter 100 extending past the end of the filter receptacle 302 is limited primarily by the need for smooth flow of the filtered air 222 into the return air duct. In a typical installation with a 4-8" deep metal boot, the housing 104 extends from about three inches to about five inches without disturbing the smooth flow of the filtered air 222.

When mounted within the housing 104, the extended pleat filter medium 102 is folded upon itself and held in an accordion or serpentine-like shape as depicted in FIG. 2. The accordion or serpentine-like shape increases the effective surface area of the extended pleat filter medium 102 exposed to the incoming air 220 entering through the front cover 106 of the air filter 100. The multiple folds of the extended pleat filter medium 102 allows the air filter 100 to have a greater filter surface area per a linear distance 250 than otherwise possible. The incoming air 220 passes through the extended pleat filter medium 102 and the filtered air 222 emerges from the air filter 100 at the back face 202 of the air filter 100. The front cover 106 that extends across the front face 114 and a back cover (not depicted) extends across the back face 214 to help retain the extended pleat filter medium 102 inside the housing 104.

Extended Pleat Filters

The extended pleat filter medium 102 in the embodiment depicted in FIG. 2 is formed from a commercially available reinforced non-woven cotton fiber sheet 140 also known as the filter medium 140 bonded to a metallic reinforcement 402. The metallic reinforcement 402 is thin metal wire formed in a substantially repeating pattern. The metallic reinforcement 402 stiffens and substantially holds the filter medium 140 in the substantially accordion-like, pleated shape shown in FIG. 2 while maximizing the exposed surface of the fiber sheet. In yet another embodiment, polymer reinforcement is used to stiffen the extended pleat filter medium 102. In yet another embodiment, the extended pleat filter medium 102 is impregnated with a fire retardant for safety.

In an alternative embodiment the extended pleat filter medium 102 is comprised of synthetic filter medium made of thermally bonded, continuous hydrophobic (moisture repelling) polyolefin fibers that resist shredding and do not absorb moisture. Synthetic medium can be electrostatically charged creating a force that attracts particles, especially smaller diameter particles.

The side edges 206 of the extended surface filter medium 102 in the embodiment shown in FIG. 2 are bonded with an adhesive compound to the inner surface of the housing 104 walls 108. In one embodiment, the side edges 206 are bonded with an adhesive compound to a fabric 208 that provides a loose fitting seal between the side edges 206 of the extended pleat filter medium 102 and the inner surface of the walls 108. The fabric 208 in one embodiment is a non-woven cotton fabric. In still another embodiment, the filter medium 140 extends beyond the length of the metallic reinforcement 402 on one side of the extended pleat filter medium 102 creating an excess 404 of filter medium 140. The excess filter medium 404 is easily folded and manipulated into the space between the side edge 206 of the extended pleat filter medium 102 where the metallic reinforcement 402 stops and the wall 204. The excess filter medium 404 is adhered to the inner surface of the wall 204 facing the excess filter medium 404 to substantially seal the extended pleat filter medium 102 on that side edge 206.

One of ordinary skill in the art can select alternative materials for the fabric 208 that work in conjunction with the adhesive to provide an effective seal between the side edges 206 and the ends 210 of the extended pleat filer medium 102 and the walls 108 of the housing 104. The ends 210 of the extended pleat filter medium 102 are bonded to a fabric 208 that provides a loose fitting seal between the ends 208 and housing 104 walls 108. In still another embodiment, the side edges 206 and the ends 210 of the extended pleat filter medium 102 are bonded with adhesive directly to the inner surface of the walls 108 of the housing 104.

In still another embodiment, the individual folds of the extended pleat filter medium 102 are held apart and separated by the presence of a pleat spacer 226. The pleat spacer 226 in the embodiment shown is fabricated from the same material as the housing 104 and has fingers 228 that are inserted between the individual folds or pleats of the extended pleat filter medium 102 as mounted inside the housing 104. The fingers 228 of the pleat spacer 226 separate the individual pleats from each other to prevent two adjacent pleats from collapsing together, thereby increasing air flow through the air filter 100. In the preferred embodiment, the fingers 228 are generally triangular shaped pieces of material, a few inches in length, that are spaced at regular intervals along a common edge of a base strip.

In another embodiment, the side edges 206 of the extended pleat filter medium 102 are fitted into forms similar in shape and dimension to the pleat spacer 226, a framework having receptacles each of which receives and holds a single pleat, of similar shape and configuration to the pleat spacer 226 except the forms are fitted against the internal surfaces of the wall 204 to substantially guide and hold the extended pleat filter medium 102 in its accordion-like shape. In this another embodiment, an adhesive is used to seal the extended pleat filter medium 102 into the forms. In still another embodiment, the forms are bonded to a fabric 208 such that the forms maintain the structure of the extended pleat filter medium 102 while forming a loosely fitting seal between the side edges 206 and the fabric 208. In yet another embodiment, an adhesive is applied to bond the side edges 206 to the fabric 208 and the forms to fix the extended pleat filter medium 102 in place within the housing 104. The loosely fitting seal formed between the extended pleat filter medium 102 and the walls 108 of the housing 104 substantially eliminates any airflow around the extended pleat filter medium 102 and effectively urges the incoming air 220 to pass through the extended pleat filter medium 102 prior to exiting the air filter 100 as filtered air 222.

Gasket

Gasket 112 in the embodiment depicted in FIG. 1 and 2 is a foam material. The filter flange 110, in the embodiment depicted, is only a gasket 112 and is about 0.5 inches thick and about 0.75 inches wide. However, one of ordinary skill in the art will size the filter flange 110 and the gasket 112 such that the extents of the filter flange 110 are substantially equivalent or smaller than the filter receptacle 302 of the return air grille 300.

Referring now to embodiments where the filter flange 110 is formed entirely of a gasket 112. The gasket 112 in one embodiment is formed from a series of straight pieces of substantially rectangular foam that are affixed with an adhesive to the exterior surface of the walls 108 of the housing 104, along the housing 104 periphery adjacent to the front cover 106, and to the abutting ends of neighboring pieces of foam. In another embodiment, the gasket 112 is formed from a continuous strip that is affixed with an adhesive to the walls 108 of the housing 104 with the two ends of the continuous gasket 112 affixed to each other. In all of these embodiments, the gasket 112 surrounds the entire periphery of the front face 114 of the housing 104.

In an alternative embodiment of the filter flange 110, shown in detail in FIG. 2A, the gasket 112 is affixed to a flange support 218. The flange support 218 is an extension of the housing 104 that provides an additional mounting surface for the gasket 112. The gasket 112 is affixed with adhesive to the filter flange 110 and the housing 104 to form a seal around the housing 104. In one embodiment, the gasket 112 is affixed to the housing 104 such that the front face 114 of the housing 104 is substantially level with the top surface of the filter flange 110 or, in another embodiment, substantially level with the top surface of the gasket 112.

In another alternative embodiment of the filter flange 110, shown in detail in FIG. 2B, two separate gaskets 112 are mounted to the top and bottom surfaces of the flange support 218. The flange support 218 is an extension of the housing 104 that provides an additional mounting surface for the gaskets 112. The gaskets 112 are then affixed with adhesive to the top and bottom surfaces of the filter flange 110 and the housing 104 to form a seal around the housing 104.

The gasket 112 is formed of a foam rubber that retains some rigidity while remaining substantially deformable. In one embodiment, the foam rubber is polyurethane foam. In still other embodiments, the foam rubber is formed from materials such as latex, neoprene, polyvinylchloride (PVC), polyethylene, microcellular urethane, vinyl-nitrile, styrene butadiene (SBR), ethylene-Diene-Propylene-Monomer (EPDM) and ethyl vinyl acetate (EVA) or equivalents as known to those of ordinary skill in the art. In yet another embodiment, where the gasket 112 is affixed to a flange support 218, the gasket 112 material is selected to be substantially more compliant to provide structural support to the filter flange 110.

These multiple embodiments are non-exhaustive examples of the multiple methods of affixing a gasket 112 to the housing 104 of an air filter 100 to create a filter flange 110. Regardless of the specific method of attachment or materials used, one of ordinary skill in the art is capable of affixing a filter flange 110 to the housing 104 that substantially fits within the extents of a filter receptacle 302 within a standard return air grille 300 and the cover flange 304 such that a seal is formed whereby the incoming air 220 is forced to pass through the air filter 100 prior to entering the duct work behind the return air grille 300 as filtered air 222.

Installation Within Standard Return Air Grille

FIG. 3 depicts a standard return air duct filter mount or return air grille 300. The return air grille 300 includes a removable or rotatable cover 308. The cover 308 includes a series of louvered grates 306 that enable incoming air 220 to enter the air filter 100 while, in the embodiment shown, cloaking the air filter 100 from easy view. The cover 308 also includes a cover flange 304. The return air grille 300 also includes an outer housing 310 that is mounted to a wall of a house and attached to the return air duct within the house. Inside the return air grille 300 is a filter receptacle 302. The filter receptacle 302 provides a recess around the periphery of the passage where the return air grille 300 is fit into the duct work. The recess in the filter receptacle 302 is sized for a standard air filter and, in the embodiment depicted, the filter receptacle 302 is sized for a standard one inch air filter. The most common size filter receptacle 302 is sized for one inch filter, however two, three, four, and five inch filter receptacles are also available, but they are uncommon. The air filter 100 fits within the standard filter receptacle 302. The filter flange 110 of the air filter 100 fits within the filter receptacle 302 while the housing 104 is sized to fit within the return air duct beyond the return air grille 300 and extend beyond the filter receptacle 302 into the duct. When the rotatable cover 308 is fitted to the outer housing 310, the cover flange 304 contacts the filter flange 110 and compresses the gasket 112 against the filter receptacle 302. The cover flange 304 holds the air filter 100 in place and by virtue of the deformable nature of the gasket 112, seals the space around the air filter 100 and the filter receptacle 302 thereby substantially preventing the flow of air around the air filter 100. When installed within the return air grille 300, the housing 104 is sized to pass through the filter receptacle 302 and be accepted into the duct emerging beyond the return air grille 300. In such a manner the extended pleat filter medium 102 is extended into the air duct and occupies a greater volume of space then otherwise available in a standard filter receptacle 302.

Extended Pleat Filter Performance

The extended pleat filter medium 102 mounted in the air filter 100 depicted in the embodiments shown provides significant additional performance over a standard filter designed to fit within the extents of a standard return air grille 300 filter receptacle 302. In comparison, a traditional 1" pleated air filter (not depicted) with a Minimum Efficiency Reporting Value (MERV) of 8 with 14 pleats per a foot of filter length 250 provides 7.5 square feet of filter medium presented to the incoming air 220. The MERV rating is developed for filters based on ASHRAE Standard 52.2 promulgated by the American Society of Heating, Refrigerating, and Air Conditioning Engineers (ASHRAE). In contrast, the air filter 100 of the embodiment depicted in FIG. 1 and 2 with an extended pleat air filter medium 102 with 12 pleats per a foot of filter length 250 provides 33.4 square feet of filter medium presented to the incoming air 220. The increased surface air of the extended pleat air filter medium 102 reduces the initial resistance to air flow through the filter (about 0.12 in WG (water gauge) for an air filter 100 with an extended pleat air filter medium 102 versus about 0.17 in WG for a standard 1" MERV 8 filter) as well as enables additional particulates to be captured resulting in an increase in service life (more than 180 days service life for an extended pleat air filter medium 102 versus 30 days service life for a standard 1" MERV 8 filter). Although the comparisons above were provided for a MERV 8 filter, the air filter 100 presented herein can be configured for multiple different MERV rating, including for example MERV 6, 10, and 13.

Conclusion

The embodiments of the invention shown in the drawing and described above are exemplary of numerous embodiments that may be made within the scope of the appended claims. It is contemplated that numerous other configurations of an extended pleat filter medium air filter may be created taking advantage of the disclosed approach. It is the applicant's intention that the scope of the patent issuing herefrom will be limited only by the scope of the appended claims.

What is claimed is:

1. An air filter for a return air grille with a filter receptacle and a closeable cover with cover flange, comprising:
    a filter flange adapted to fit within the filter receptacle comprising a gasket, wherein the closure of the cover causes the cover flange to contact said filter flange and compress said gasket against the filter receptacle;
    a housing with walls defining an internal volume, said housing affixed to said filter flange whereby said housing extends beyond the filter receptacle away from the closeable cover; and,
    an extended pleat filter medium with a pair of side edges and a pair of ends comprising a filter medium and a means for reinforcing said filter medium, wherein said extended pleat filter medium is disposed within said internal volume in a substantially accordion-like shape and further comprising a means of substantially sealing substantially an entire perimeter of said extended pleat filter medium to an inner surface of said walls of said housing.

2. The air filter of claim 1, wherein said filter medium is a non-woven cotton fiber sheet.

3. The air filter of claim 1, further comprising a pleat separator insert affixed to said housing to maintain separation between alternating pleats of said extended pleat filter medium.

4. The air filter of claim 1, whereby said means of substantially sealing said extended pleat filter medium to said inner surface of said walls is an adhesive applied between said pair of side edges and said pair of ends of said extended pleat filter medium and said inner surface of said walls.

5. The air filter of claim 4, whereby said means of substantially sealing said extended pleat filter medium to said inner surface of said walls further comprises a fabric that substantially lines said inner surface of said walls of said housing where said pair of side edges of said extended pleat filter medium contact said inner surface of said walls of said housing.

6. The air filter of claim 1, whereby said housing is fabricated of a laminated paperboard.

7. The air filter of claim 1, wherein said gasket material is selected from the group consisting of: latex, neoprene, polyvinylchloride (PVC), polyethylene, microcellular urethane, vinyl-nitrile, styrene butadiene (SBR), ethylene-Diene-Propylene-Monomer (EPDM) and ethyl vinyl acetate (EVA).

8. The air filter of claim 1, wherein said housing extends beyond the filter receptacle by a length between about three inches and about five inches.

9. The air filter of claim 1, wherein said filter medium is comprised of thermally bonded, polyolefin fibers.

10. An air filter for a return air grille attached to a return air duct with a filter receptacle and a closeable cover with cover flange comprising:
    a gasket with an upper surface, said gasket disposed to fit within the filter receptacle such that the entire periphery of the filter receptacle is substantially covered by said gasket, wherein the closure of the cover causes the cover flange to contact said upper surface of said gasket and compress said gasket against the filter receptacle;
    a housing with walls, a front cover and a back cover defining an internal volume, said housing affixed to said gasket whereby said housing extends beyond the filter receptacle away from the closeable cover and said front cover is substantially flush with said upper surface of said gasket; and,
    an extended pleat filter medium with a pair of side edges and a pair of ends comprising a filter medium and wire reinforcement, wherein said extended pleat filter medium is disposed within said internal volume in a substantially accordion-like shape and a means of substantially sealing said extended pleat filter medium an inner surface of to said walls of said housing.

11. The air filter of claim 10, wherein said filter medium is a non-woven cotton fiber sheet.

12. The air filter of claim 10, whereby said means of substantially sealing said extended pleat filter medium to said inner surface of said walls is an adhesive applied between said side edges and said pair of ends of said extended pleat filter medium and said inner surface of said walls.

13. The air filter of claim 12, whereby said means of substantially sealing said extended pleat filter medium to said inner surface of said walls further comprises a fabric sheet that substantially lines said inner surface of said walls of said housing where said pair of side edges of said extended pleat filter medium contact said inner surface of said walls of said housing.

14. The air filter of claim 10, wherein said gasket is formed from four discrete substantially rectangular sections of foam rubber to said housing such that each said discrete section of foam rubber abuts and is affixed to the neighboring said discrete section of foam rubber in addition to said housing.

15. An air filter for a return air grille with a filter receptacle comprising a recessed portion and an internal periphery and a closeable cover with cover flange comprising:
    a substantially rectangular gasket with an upper surface comprised substantially of foam rubber adapted to fit within the recessed portion of the filter receptacle such that said gasket extends at least partially beyond the internal periphery of the filter receptacle, wherein the closure of the cover causes the cover flange to contact said upper surface of said gasket and compress said gasket against the filter receptacle;
    a housing with walls, a front cover and a back cover defining an internal volume, said housing affixed to said gasket whereby said housing extends beyond the filter receptacle away from the closeable cover and said front cover is substantially flush with said upper surface of said gasket; and,
    an extended pleat filter medium with a first side edge and a second side edge and a pair of ends and a top surface disposed toward said front cover and a bottom surface disposed toward said back cover, comprising a filter medium on said top surface and wire reinforcement on said bottom surface, wherein said extended pleat filter medium is disposed within said internal volume in a substantially accordion-like series of folds and a means of substantially sealing said extended pleat filter medium to an inner surface of said walls of said housing.

16. The air filter of claim 15, wherein said means of substantially sealing said extended pleat filter medium to said walls comprises:
    an unreinforced filter medium extension formed on said extended pleat filter medium where said filter medium extends beyond said wire reinforcement on said first side edge such that when said extended pleat filter medium is disposed within said internal volume said filter medium extension is folded between said wall and said first side edge and affixed to said inner surface of said wall facing said first side edge;
    a fabric sheet that is substantially affixed to said inner surface of said walls facing said second edge side and said second edge side is substantially affixed to said fabric sheet; and,
    an adhesive that substantially affixes said ends to said inner surface of said walls facing said ends of said extended pleat filter medium.

17. The air filter of claim 15, further comprising a pleat spacer to separate each individual said folds from the neighboring said folds.

18. The air filter of claim 15, wherein said filter medium is made from non-woven cotton fiber sheet.

19. The air filter of claim 15, wherein the total surface area of said top surface of said extended pleat filter medium is between about three times to about five times greater than a standard pleat air filter medium that does not extend beyond the filter receptacle.

20. The air filter of claim 1 wherein said gasket extends around substantially an entire perimeter of said housing.

* * * * *